UNITED STATES PATENT OFFICE.

JAMES H. PATTERSON, OF SHREWSBURY, NEW JERSEY.

COMPOSITION OF MATTER FOR MAKING BILLIARD-BALLS, COMBS, &c.

SPECIFICATION forming part of Letters Patent No. 426,513, dated April 29, 1890.

Application filed December 4, 1889. Serial No. 332,572. (No specimens.)

*To all whom it may concern:*

Be it known that I, JAMES H. PATTERSON, a citizen of the United States, residing at Shrewsbury, in the county of Monmouth and State of New Jersey, have invented a certain new and useful composition of matter to be used for the making of billiard and pool balls, comb-backs, combs, martingale-rings, door-knobs, poker-chips, and dice, and like articles; and I do hereby declare the following to be a full, clear, and exact description of the invention, such as will enable others skilled in the art to which it appertains to make and use the same.

My composition consists of the following ingredients, combined in the proportions stated, viz: zinc-white, eight ounces; shellac, four pounds; camphor, two pounds; alcohol, one-half gallon; glycerine, castor-oil, and alcohol mixed, four ounces; nitrogenized rags, four pounds; French chalk, five pounds. These ingredients are to be thoroughly mingled and mixed. After thoroughly mixing them I roll them into sheets, cut into pieces, and then dry them. After drying I grind the pieces into a fine powder. This is then put into pans and for a space of twenty minutes roasted on steam-tables. After this roasting the material is placed in dies and put under great pressure. For billiard and pool balls twenty-seven tons pressure to each ball. For the other articles mentioned I find one half of this pressure to be sufficient.

By the use of the above composition an article is obtained of the hardness of iron, of great elasticity, very durable and lasting, and which will not chip, split, or crack.

I am aware that a composition consisting of alcohol, camphor, and shellac with other ingredients has heretofore been used for the same purpose; but I am not aware that any of the other ingredients used by me in my composition have been used together or used with alcohol, camphor, and shellac or used in the proportions stated.

What I claim as my invention, and desire to secure by Letters Patent, is—

The herein-described composition of matter to be used for the manufacture of billiard and pool balls, combs, comb-backs, martingale-rings, door-knobs, poker-chips, and dice, consisting of zinc-white, shellac, camphor, alcohol, nitrogenized rags, and French chalk with glycerine, castor-oil, and alcohol mixed, all in the proportions as above specified.

In testimony whereof I affix my signature in presence of two witnesses.

JAMES H. PATTERSON.

Witnesses:
ALEX A. YARD,
WM. H. HENDRICKSON, Jr.